United States Patent
D'Errico et al.

(10) Patent No.: US 11,921,322 B2
(45) Date of Patent: Mar. 5, 2024

(54) PHOTONIC WAVEGUIDE

(71) Applicant: Telefonaktiebolaget LM Ericsson (PUBL), Stockholm (SE)

(72) Inventors: Antonio D'Errico, Pisa (IT); Alessandra Bigongiari, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 155 days.

(21) Appl. No.: 17/271,333

(22) PCT Filed: Aug. 30, 2018

(86) PCT No.: PCT/EP2018/073405
§ 371 (c)(1),
(2) Date: Feb. 25, 2021

(87) PCT Pub. No.: WO2020/043299
PCT Pub. Date: Mar. 5, 2020

(65) Prior Publication Data
US 2021/0341673 A1    Nov. 4, 2021

(51) Int. Cl.
G02B 6/122 (2006.01)
G02B 6/02 (2006.01)

(52) U.S. Cl.
CPC ....... G02B 6/1225 (2013.01); G02B 6/02338 (2013.01); G02B 6/1223 (2013.01)

(58) Field of Classification Search
CPC .......... G02B 6/02338; G02B 6/1223; G02B 6/1225; G02B 6/1226; G02F 1/025; G02F 2203/10
See application file for complete search history.

(56) References Cited

U.S. PATENT DOCUMENTS 7,471,852 B2 * 12/2008 Hamada ............... G02F 1/0118
385/2
2008/0084597 A1    4/2008 Hamada
(Continued)

FOREIGN PATENT DOCUMENTS

CN    103531665 A  *  1/2014
CN    105217604 A  *  1/2016
(Continued)

OTHER PUBLICATIONS

Tianhua Yu, Chen-Wei Liang, Changdong Kim, and Bin Yu, "Local electrical stress-induced doping and formation of monolayer graphene P—N junction", Appl. Phys. Lett. 98, Jun. 13, 2011, 243105(1-3). (Year: 2011).*

(Continued)

Primary Examiner — Daniel Petkovsek
(74) Attorney, Agent, or Firm — BAKER BOTTS L.L.P.

(57) ABSTRACT

Embodiments described herein provide a waveguide for transmitting electromagnetic radiation. The waveguide comprising a core region, a cladding region extending around the core region; and a first layer of a material having a thickness of less than a skin depth of the material for electromagnetic radiation of a first wavelength; wherein the first layer is configured with a periodic refractive index and positioned within the waveguide such that a first surface polariton wave is excited at an interface between the core region and cladding region when electromagnetic radiation of the first wavelength is transmitted through the core region. There is also provided a method of manufacture of the waveguide.

19 Claims, 11 Drawing Sheets

(56) References Cited

U.S. PATENT DOCUMENTS

| | | | |
|---|---|---|---|
| 2010/0158445 A1 | 6/2010 | Kim et al. | |
| 2013/0071060 A1* | 3/2013 | Kim | G02B 6/00 385/11 |
| 2013/0071083 A1* | 3/2013 | Kim | G02B 6/12 385/131 |
| 2014/0056551 A1* | 2/2014 | Liu | G02F 1/025 977/734 |
| 2014/0105553 A1 | 4/2014 | Kim et al. | |
| 2014/0161405 A1* | 6/2014 | Kim | B82Y 20/00 385/126 |
| 2016/0227639 A1* | 8/2016 | Kaminer | H05H 3/00 |

FOREIGN PATENT DOCUMENTS

| | | | | |
|---|---|---|---|---|
| EP | 1 305 659 B1 | 8/2004 | | |
| JP | 2015 114497 A1 | 6/2015 | | |
| KR | 20110067930 A * | 6/2011 | | G02B 6/12 |
| WO | WO-2004023177 A2 * | 3/2004 | | B82Y 20/00 |
| WO | 2015 128654 A1 | 9/2015 | | |

OTHER PUBLICATIONS

Chrip Management in Silicon-Graphene Electro Absorption Modulators by V. Sorianello et al.; Research Article, Optics Express 19371, vol. 25, No. 16—Aug. 2017.

Nano Letters; High-Responsibility Graphene-Boron Nitride Photodetector and Autocorrelator in a Silicon Photonic Integrated Circuit by Ren-Jye Shiue et al.; American Chemical Society, ACS Publications—2015.

PCT Notification of Transmittal of the Internatinoal Search Report and the Written Opinion of the Internatinoal Searching Authority, or the Declaration issued for International application No. PCT/EP2018/073405—dated May 17, 2019.

Light Detection in Double Graphene Layer Coated Waveguides by M. Midrio et al.; CNIT—2019.

Noise in Resonant Optical Amplifiers of General Resonator Configuration by Evan L. Goldstein and Malvin C. Teich, Fellow, IEEE; IEEE Journal of Quantum Electronics, vol. 25, No. 11—Nov. 1989.

Plasmonic Amplification of Terahertz Radiation in a Periodic Graphene Structure With the Carrier Injection by Olga V. Polischuk et al.; Appl. Phys. Lett. 111, 081110—2017.

Surface Plasmons on Smooth and Rough Surfaces and on Gratings by Heinz Raether—1988.

Toward the Creation of Terahertz Graphene Injection Laser by V. Ryzhii et al.; J. Appl. Phys. 110, 094503—2011.

Ultrafast Carrier Dynamics and Terahertz Emission in Optically Pumped Graphene at Room Temperature by S. Boubanga-Tombet et al.; Physical Review B 85, 035443—2012.

Chinese Office Action issued for Application No. 201880097001.9—dated Aug. 17, 2022.

EPO Communication pursuant to Article 94(3) EPC issued for Application No. 18 762 508.2-1207—dated May 25, 2023.

* cited by examiner

PHOTONIC WAVEGUIDE

PRIORITY

This nonprovisional application is a U.S. National Stage Filing under 35 U.S.C. § 371 of International Patent Application Serial No. PCT/EP2018/073405 filed Aug. 30, 2018 and entitled "Photonic Waveguide" which is hereby incorporated by reference in its entirety.

TECHNICAL FIELD

Embodiments described herein relate to a photonic waveguide and a method of manufacture of the same. In particular, a photonic waveguide is described in which surface polaritons are excited at an interface between the core and cladding regions of the waveguide in order to avoid losses into the cladding material of the photonic waveguide.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In Opto-Electronics, it may be desirable to develop technologies that can ensure the clear transmission of electromagnetic wave signals in photonic waveguides, and that reduce any predictable or unpredictable loss and light mode scattering. The smaller and the more complex the photonic circuit is, the harder it is to ensure the confinement of light within the photonic waveguide and to control losses and unwanted light scattering.

It may also be desirable to perform reliable confinement of light whilst limiting the impact of the confinement mechanisms on the operative performance of the signal transmission in the photonic waveguide. This aspect may be valid for light propagation in a waveguide, light coupling with photonic connectors positioned at the optical fiber ends of an optical cable, and for photonic integrated circuits defined in current photonic optical transceivers, switches or any other photonic device.

New photonic circuits are therefore being designed with higher light propagation performance by using different materials, for example, transparent metals or semi-metal materials, in order to ensure compatibility with the industrial processes for generating optical fibers or complementary metal-oxide-semiconductor (CMOS) based photonic circuit fabrication. Some solutions are based on the use of alternative waveguide or fiber design.

However, most of these solutions aim at simplifying the structure of photonic devices or techniques to reduce cost and power leakage while ensuring transmission reliability.

In optics, electromagnetic wave propagation and coupling with the allowed propagation modes are implemented by proper photonic design for the realization of a dedicated optical path to confine light whilst avoiding leakage.

In particular, some configurations of an optical circuits may not allow for efficient light confinement due to physical dimensions compatibility or a lack of proper refractive index step change without affecting the system structure and/or reducing system performance. Unfortunately, current approaches introduce unwanted optical losses (e.g. due to scattering of an optical beam out of the waveguide or optical fiber) generating the need for an optical power supply chain for allowing the electromagnetic waves still propagating in the system to recover from the unwanted leakage. Leveraging on current state of the art, the higher the number of power recovering devices (e.g. optical amplifiers or optical lenses) and the higher the complexity of the designed optical circuitry is, the lower the reliability and performance of the overall system.

The above observations suggest that amplifiers are optimized to generate optical gain for an optimal amplification from all inserted losses along an optical path. An alternative approach is to reduce all the sources of optical power leakage through enhancement of optical mode coupling and confinement and to introduce an intrinsic gain along the optical path. The term intrinsic here is used to define gain solutions achieved by the nature of the materials used and the type of design for the optical path itself, where the intrinsic gain is realized mostly on the range of wavelengths that are of interest in the environment.

Some examples of such intrinsic gain solutions are those based on resonant structures where a gain media and a particular resonating cavity is used. A issue in these examples may be the generation of Amplified Spontaneous Emission which may limit the Optical Signal to Noise Ratio (OSNR) degradation which is caused by cascading several stages of amplification. It may be desirable to limit this degradation or to avoid any source of amplified spontaneous emission in order to improve the system margins of the communication system such that they suffer less from incumbent dependence on OSNR degradation.

However, optical waveguide may also be optimized to work with high power electromagnetic waves and to introduce the lowest possible loss or leakage whilst still occupancy small areas within the system. A truly functional waveguide would be designed to have very small footprint, with no supply chain, biasing circuitry or impedance adaptation. Given this, the lowest possible impact and perturbation into the integrated system would be possible.

SUMMARY

According to some embodiments there is provided a waveguide for transmitting electromagnetic radiation. The waveguide comprises a core region, a cladding region extending around the core region; and a first layer of a material having a thickness of less than a skin depth of the material for electromagnetic radiation of a first wavelength; wherein the first layer is configured with a periodic refractive index and positioned within the waveguide such that a first surface polariton wave is excited at an interface between the core region and cladding region when electromagnetic radiation of the first wavelength is transmitted through the core region.

According to some embodiments there is provided a method of manufacture of a waveguide. The method comprises providing a first layer of a material having a thickness of less than a skin depth of the material for electromagnetic radiation of a first wavelength in a waveguide, wherein the first layer is positioned within the waveguide and configured with a periodic refractive index such that a first surface polariton wave is excited at an interface between a core region of the waveguide and a cladding region of the waveguide when electromagnetic radiation of a first wavelength is transmitted through the core region.

BRIEF DESCRIPTION OF THE DRAWINGS

For a better understanding of the present invention, and to show how it may be put into effect, reference will now be made, by way of example only, to the accompanying drawings, in which:—

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
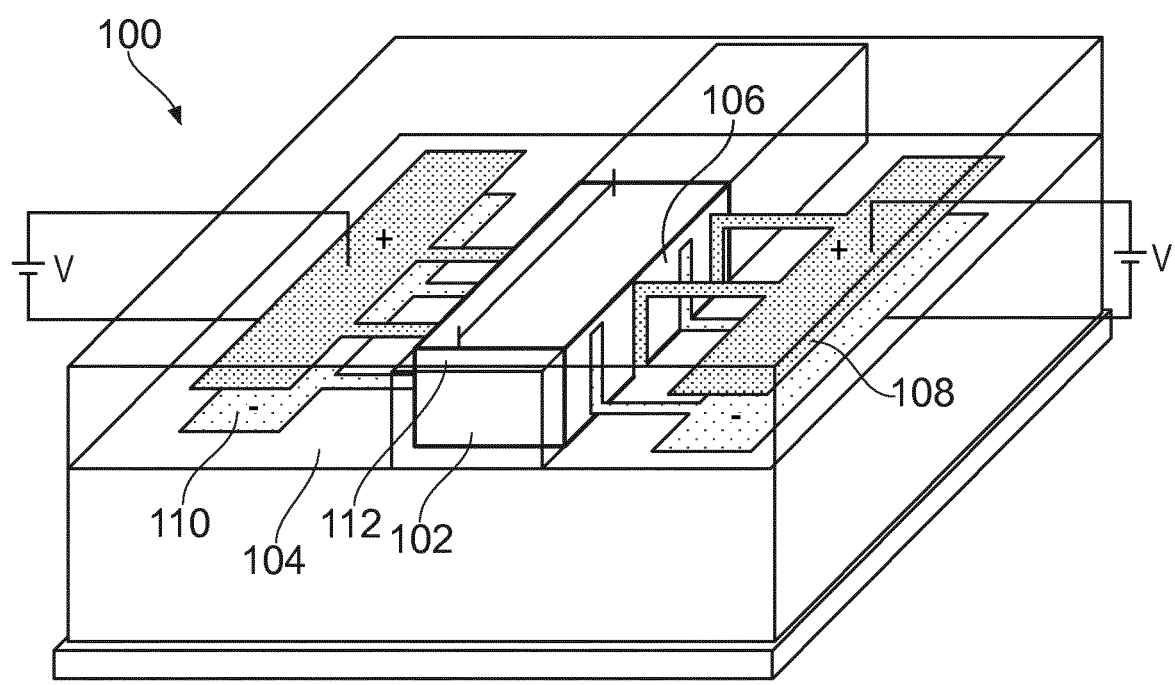
FIG. 1 illustrates an example of a waveguide according to some embodiments.

FIG. 1 illustrates an example of a waveguide 100 according to some embodiments. The waveguide 100 comprises a core region 102 and a cladding region 104. When electromagnetic radiation is transmitted down the core region 102 of the waveguide 100 the respective refractive indices of the core region 102 and the cladding region 104 confine the electromagnetic radiation within the core region 102. In some aspects, the electromagnetic radiation is light and the waveguide is an optical waveguide. The waveguide 100 further comprises a first layer 106 of a material, the first layer 106 having a thickness of less than a skin depth of the material for electromagnetic radiation of a first wavelength. In this example, the first layer 106 is positioned at the interface between the core region 102 and the cladding region 104. For example, the first layer 106 may comprise a layer of graphene, or other metamaterial. By maintaining the thickness of the first layer 106 lower than the skin depth of the material, the penetration length of the field propagating in the waveguide remains substantially unchanged and the boundary conditions at the core/cladding interface may be given by the bulk properties (refraction index) of the core region 102 and cladding region 104 materials respectively.

A bi-dimensional material like graphene has a thickness significantly lower than the so called "skin depth" of the bulk material, the typical penetration depth of an electrical field in a metal, which may be some orders of magnitude higher than a single atom dimension. In some aspects, the bi-dimensional material may be considered as a material having one of its dimensions being very small compared to its other two dimensions, such the material has different physical properties in the small dimension compared to its larger dimensions. The first layer 106, e.g. graphene, may be defined as a bi-dimensional material instead, or in addition to, a definition including skin depth.

The first layer 106 may then be positioned within the waveguide and configured with a periodic refractive index such that a first surface polariton wave is excited at an interface between the core region 102 and the cladding region 104 when electromagnetic radiation of a first wavelength is transmitted through the core region 102. It will be appreciated that the first surface polariton wave may penetrate the core and cladding regions to some small extent.

The positioning of the first layer may therefore be such that the first layer is close enough to the interface between the core region 102 and the cladding region 104 such that a surface polariton may be efficiently excited. For example, the first layer may be located in the cladding or in the core of the waveguide. In some examples, the first layer may be considered as adjacent (or at) the interface of the core and cladding. For example, the first layer of material may be located within a skin depth of a surface polariton wave generated by the electromagnetic radiation from the core region from the interface between the core region and the cladding region.

Therefore, instead of losses occurring through scattering of electromagnetic radiation into the cladding region 104 of the waveguide, a surface polariton wave may be excited at the interface between the core region 102 and the cladding region 104. The energy of this surface polariton may then be preserved rather than lost.

However, in order for the first surface polariton to be excited when electromagnetic radiation of a first wavelength is transmitted through the core region 102, the momentum of the first surface polariton $k_{s,1}'$ is matched to the momentum of the electromagnetic radiation propagating through the core region 102.

Figure 2:
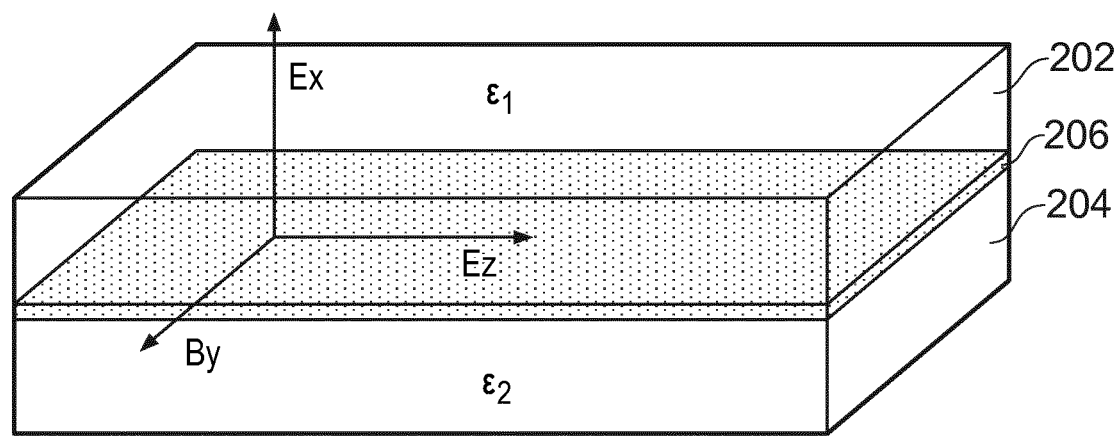
FIG. 2 illustrates two regions with respective refraction indexes $\varepsilon_1$ and $\varepsilon_2$ separated by a contact interface.

For example, as illustrated in FIG. 2 two regions 202 and 204 with respective refraction indexes $\varepsilon_1$ and $\varepsilon_2$ are separated by a contact interface 206 and a magnetic field is parallel to the contact interface 206. It will be noted that in this example, the polarization is defined with respect to the interface where the surface wave propagates. This differs from the common definition of the polarization in a waveguide where the polarization is always defined with respect with the surface that is parallel to the largest surface (horizontal) of the substrate (e.g. silicon on insulator substrate). This means that in a waveguide designed for Trans-Electric (TE) mode the interfaces where the surface polariton wave can propagate are the side walls, whereas in a waveguide designed for Trans-Magnetic (TM) the interfaces where the surface polariton wave can propagate are the ceiling and floor surfaces.

The electric field in the direction perpendicular to the contact interface 206 may be given by:

$$E_x = e^{-q_1 x} e^{ikz - i\omega t} H(x) + e^{q_2 x} e^{ikz - i\omega t} H(-x)$$

Where H(x) is the Heaviside step function, $k_z=2\pi/\lambda$ is the wave vector of the electromagnetic radiation parallel to the interface, $\omega$ is the angular frequency of the wave, t is time, and $q_i$ (i=1; 2) are the evanescence lengths in the two regions 202 and 204 respectively (in this notation both k and q are real valued).

$$q_i = \sqrt{k^2 - \frac{\epsilon_i \omega^2}{c^2}} \qquad (A)$$

Applying Maxwell's equations, we obtain $$E_{1x} = -\frac{kc}{\omega \epsilon_1} B_y$$

$$E_{2x} = -\frac{kc}{\omega \epsilon_2} B_y$$

$$E_{1z} = -\frac{q_1 c}{\omega \epsilon_1} B_y$$

$$E_{2z} = \frac{q_2 c}{\omega \epsilon_2} B_y,$$

for the electric fields in the two materials in the x and z directions. Without a first layer near to or at the contact interface, the matching relationship is found by imposing the continuity of the electric field along the surface $E_{1z}=E_{2z}$.

$$\frac{q_1}{q_2} = -\frac{\epsilon_1}{\epsilon_2}$$

However, when a first layer 206, for example graphene, is present close to or at the interface between the two regions 202 and 204, the resonance condition is modified to include the effects of surface currents graphene expressed through its dynamic conductivity.

$$\frac{\epsilon_1}{\sqrt{k^2 - \frac{\epsilon_1 \omega^2}{c^2}}} + \frac{\epsilon_2}{\sqrt{k^2 - \frac{\epsilon_2 \omega^2}{c^2}}} = -\frac{i\sigma(\omega, k)}{\omega \epsilon_0} \qquad (B1)$$

Where $\epsilon_1$ and $\epsilon_2$ are the relative dielectric constant of the media and $\sigma$ is the dynamic conductivity of graphene.

For example, for a silicon photonics waveguide, where the core region comprises silicon having a refractive index is $n_1=3.5$, and the cladding region comprises silicon dioxide having a refractive index of $n_2=1.2$ wherein the dielectric constant is given by $\epsilon_i = n_i^2$.

Equation (B) may therefore give the resonance condition for a surface polariton in the graphene at the contact interface 206. For example, for $\sigma=0$, $n_1=3.5$ and $n_2=1.2$ the resonance condition results in a predicted wave-vector for a surface polariton wave in the graphene layer of $$k = k_s = 1.13 \frac{\omega}{c},$$

where $k_s$ is the value k of the solution of the equation (B1) above.

However, as previously mentioned, to efficiently excite the surface polariton wave, the momentum of the electromagnetic wave in the core region has to match the momentum of the surface polariton wave to be excited. The frequency, $\omega$, of the surface polariton wave may also be required to match the frequency of the electromagnetic wave.

In other words, the momentum of the excited surface wave may be required to equal the momentum of the electromagnetic wave in the core region, where the momentum of the electromagnetic wave in the core region can be calculated from the equation:

$$k_c = n_1 \frac{\omega}{c} \qquad (B2)$$

So, for the above example where $n_1=3.5$, $$k_c = 3.5 \frac{\omega}{c}.$$

In its current configuration, without a periodic refractive index, the surface wave at the interface between the core region 102 and the cladding region 104 would not match the momentum of the electromagnetic radiation in the core region 102 and would therefore not be excited. Therefore, additional momentum may be added to the surface polariton wave.

In some examples, this additional momentum may be provided by adding a periodic refractive index variation along the first layer.

The periodic refractive index may provide a similar effect to a Bragg grating and may increase the momentum of the surface polariton wave to $$k'_{s,1} = \left(k_{s,1} + \frac{\omega m \lambda}{c a_{mod,1}}\right) = k_c, \qquad (C)$$

where $a_{mod}$ is the period of the modulation of the refractive index, m is an integer value, $\omega$ is the frequency of the radiation propagated through the core region, and $\lambda$ is the wavelength of the radiation that is propagated in the core region. As the values of $k_c$ and $k_{s,1}$ can be calculated as described above with relation to equations (B1) and (B2), based on the properties of the materials forming the waveguide, an appropriate value for the period of the modulation of the refractive index $a_{mod}$ can be calculated from equation (C), where $\omega$ is the frequency of the radiation that is propagated in the waveguide core (in telecommunication these are given by an ITU grid, e.g. 191.15 to 196.10 THz for the C-band) and $\lambda$ is the wavelength of the radiation that is propagated in the waveguide core. Thus, the periodicity $a_{mod}$ of the periodic refractive index may be calculated using the above features and principles.

The periodic refractive index may be obtained in a number of different ways, for example chemical or electrostatic local doping to generate localized pn junctions in the first layer.

In the example illustrated in FIG. 1, the periodic refractive index in the first layer 106 is introduced using periodic carrier density variations. In particular, in this example, the waveguide comprises a first set of electrical contacts 108 positioned to locally electrostatically dope the first layer 106 to generate the periodic irregular refractive index in the first layer 106. A voltage may be applied to the first set of electrical contacts 108 to electrostatically dope the first layer 106, for example, the voltage may be lower than 1.5 Volts. The first set of electrical contacts 108 may comprise standard metal contacts (for example, Tungsten, Titanium, Palladium, Gold or even Copper).

In this example therefore, the first set of electrical contacts 108 may be positioned such that $a_{mod,1}=d_1+2l_1$ where $d_1$ is a distance between two adjacent contacts of the first set of electrical contacts and $l_1$ is a width of a contact in the first set of electrical contacts.

Figure 3:
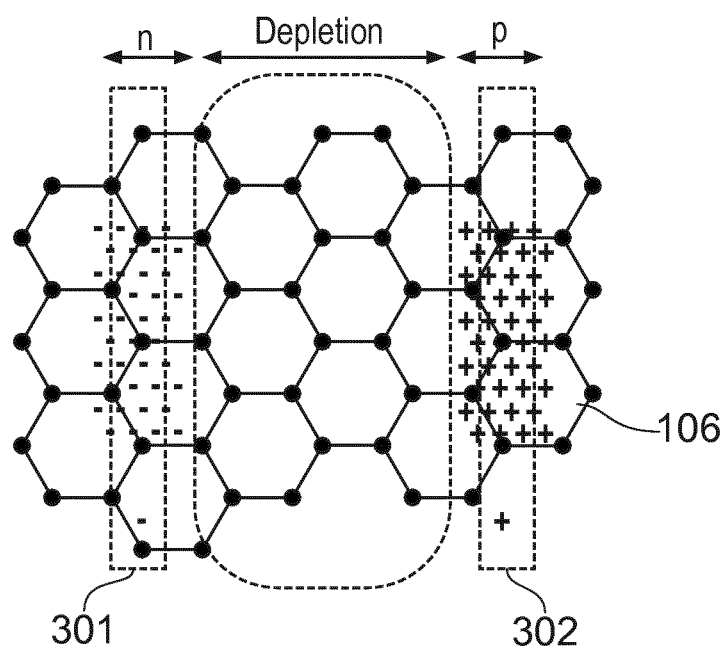
FIG. 3 illustrates a pn junction realized by electrostatic doping of a layer of graphene.

In this way, by applying a voltage across the two adjacent electrical contacts, the electrical contacts may introduce periodic carrier density variations, as illustrated in FIG. 3. FIG. 3 illustrates a pn junction realized by electrostatic doping of a layer of graphene.

It will be appreciated, that two adjacent electrical contacts, for example electrical contact 301 and electrical contact 302, are oppositely biased. Each part of the electrical contact grating generated by the first set of electrical contacts 108 relates to direct physical contacts located in those parts of the waveguide where energy of propagating light is close to zero.

As can be seen, at the location of the negatively charged contact 301 the n region of the pn junction is generated. Equivalently, at the location of the positively charged contact 302 the p region of the pn junction is generated.

A repetition of this arrangement of negative and positive adjacent contacts along the first layer 106, may provide the periodic refractive index modulation as described in equation (C).

When the periodicity of the refractive index along the first layer 106 is disrupted, the surface polariton wave can no longer propagate as the momentum of the first surface polariton will no longer match with the resonance momentum of the first layer 106. In these circumstances, due to the boundary conditions of the core region 102 and the cladding region 104, the energy contained in the surface polariton wave is transferred back into an electromagnetic wave of the same momentum in the core region 102.

In this way, energy which may otherwise be lost due to scattering effects into the cladding region 104, can be converted into surface polariton waves and then returned to the core region 102 as an electromagnetic wave having the same momentum.

The coupling between the electromagnetic wave in the core region 102 and the surface polariton wave excited at the interface between the core region 102 and the cladding region 104 may be vectorial. In other words, the matching of the momentum may involve the component of the of the electromagnetic wave momentum in the direction of propagation of the surface polariton wave. In the configuration FIG. 3 the surface wave propagates along the z axis and the electromagnetic wave in the core region 102 also propagates along the z axis. Therefore, the matching condition determined by the periodicity $a_{mod}$ is provided to match the momentum of the electromagnetic wave in the core region $k_c$ and the momentum of the surface polariton wave $k_s'$. Once the periodic index variation is removed, the same matching condition is applied in the conversion of the energy of the surface polariton wave back into the electromagnetic radiation propagating in the core region 102, therefore the light is bound to propagate with $k_c=n_1\omega/c$, in the core region, along the z axis.

The vectorial coupling may not allow for the reflection of the surface polariton wave towards negative z (as illustrated in FIG. 2). For example, for a given wavelength of the propagating radiation and refraction index of core region 102 and cladding region 104, it is possible to select a refractive index periodicity $a_{mod}$ such that the coupling of the electromagnetic wave in the core region 102 and the surface polariton wave is achieved for a given integer m. Therefore, the solution allows for the selection, within the limit of the coupling condition, of a value of $a_{mod}$ that meets existing fabrication or geometry constraints of the general design.

In some examples, the electromagnetic radiation in the core region 102 has an incidence at an angle α with respect to the first layer 106. In this example, the momentum of the surface polariton wave may be matched to the momentum of the electromagnetic wave in the direction of the surface polariton wave, e.g. $k_{s,1}'=k_c \cos α$. Consequently, by setting the modulation periodicity such that $k_{s,1}'=k_c$, the excitation of the surface polariton wave will be peaked at α=0. For normal incidence $k_s=0$ and two counter-propagating surface polariton waves with the same momentum (absolute value) are generated:

$$k_{s,1\mp} = \mp\frac{\omega}{c}\frac{m\lambda}{a_{mod}}$$

Figure 4:
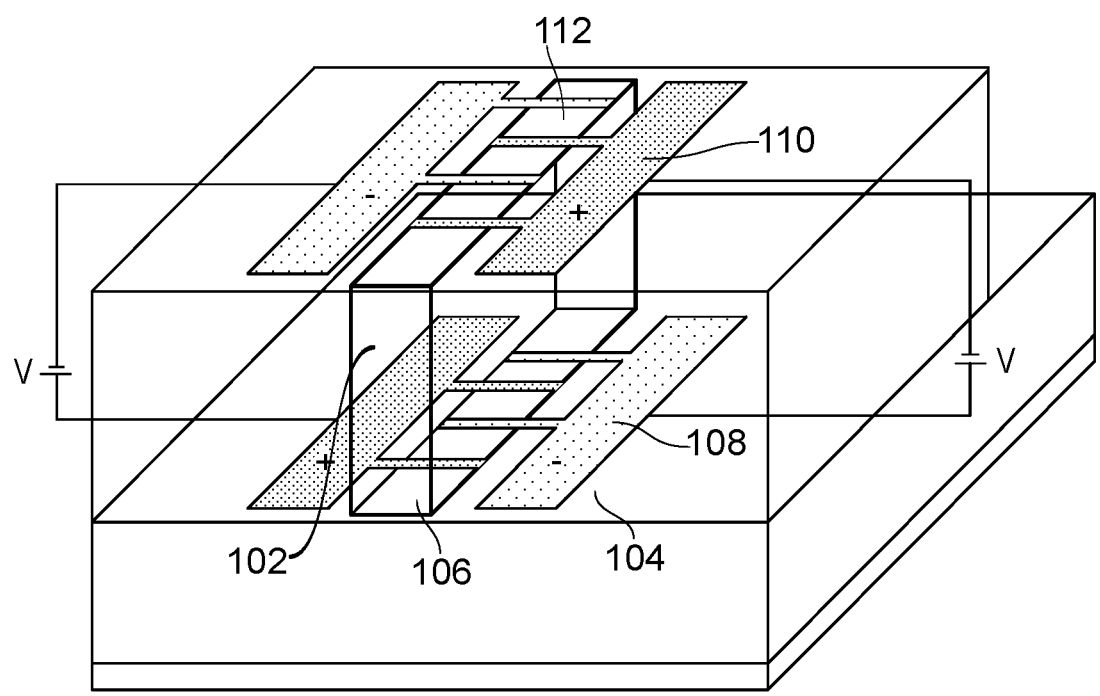
FIG. 4 illustrates an example of a waveguide according to some embodiments.

In FIG. 1, the first layer 106 is placed alongside the waveguide core region. This is for the TE propagation mode in single mode operation. However, it will be appreciated, as illustrated in FIG. 4, that the first layer may be placed on top of the core of a rectangular shaped waveguide, in case of TM mode propagation.

It will also be appreciated, that the waveguide core region 102 may be of any suitable shape, and that the first layer 106 may be placed at or close enough to the interface between the core region 102 and the cladding region 104 in any suitable position.

In the example illustrated in FIG. 1, the waveguide comprises a second layer 112 material having a thickness of less than a skin depth of the material for electromagnetic radiation of the first wavelength or a second wavelength, positioned on the opposite side of the core region 102 to the first layer configured for TE propagation mode of the waveguide 100.

In this example, both the first layer 106 and the second layer 112 are configured to excite first surface polariton waves having the same momentum. To implement this, two sets of electrical contacts are illustrated 108 and 110. In this example, the two sets of electrical contacts 108 and 110 are configured to locally electrostatically dope the first layer 106 and second layer 112 as illustrated in FIG. 3.

In the example of FIG. 4 the position of the first layer 106 and the second layer 112 is altered such that the first layer 106 and the second layer 112 are positioned on the ceiling and floor of the waveguide. As previously described, this positioning of the first layer and the second layer initiates trans-magnetic mode of propagation through the core region.

Figure 5:
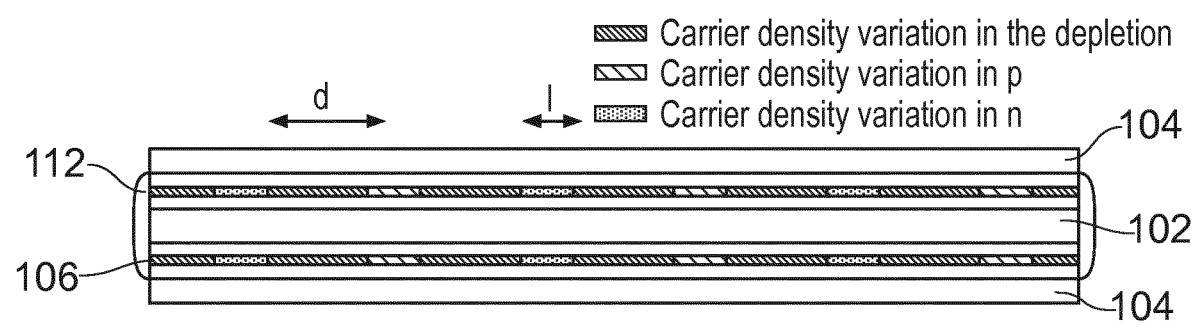
FIG. 5 illustrates a top view cross section of the waveguide illustrates in FIG. 1.

FIG. 5 illustrates a top view cross section of the waveguide 100 illustrates in FIG. 1. Alternatively, this Figure may be viewed as a lateral view of the waveguide 100 illustrated in FIG. 4. In particular, a periodic carrier density variation in the two first layers 108 and 106 is illustrated. The distances $d_1$ and $l_1$ may be determined by the positioning of the electrical contacts, as illustrated in FIG. 3.

FIGS. 1 and 4 both show a double gate configuration. However advantageously a single gated configuration could be implemented as well.

A current, generated by the portion of electromagnetic radiation intercepting the first layer in correspondence with the periodic refractive index, is related to the applied voltage at the two electrical contacts. Energy can be transferred to the surface polariton wave by setting a suitable voltage at the two oppositely charged electrical contacts. The energy captured by the surface polariton wave from the travelling wave in the core region 102 and from the applied voltage to the first layer 106 may then be transferred into the core region 102 of the waveguide when the periodicity of the refractive index of the first layer 106 is interrupted. In other words, in the absence of periodically electrostatically doped material at the first layer 106, the boundary conditions of the proposed set-up are not suitable for the propagation of the excited polariton wave. The energy of the surface polariton wave is therefore released from the surface polariton wave into the core region 102 of the waveguide, where boundary conditions allow the propagation of the electromagnetic radiation emerging from the periodic structure. The overall effect is a reduction to zero of losses experienced by the propagating wavelength or even a resulting gain in the system if a suitable voltage is applied to the electrical contacts, as will be described below.

Figure 6:
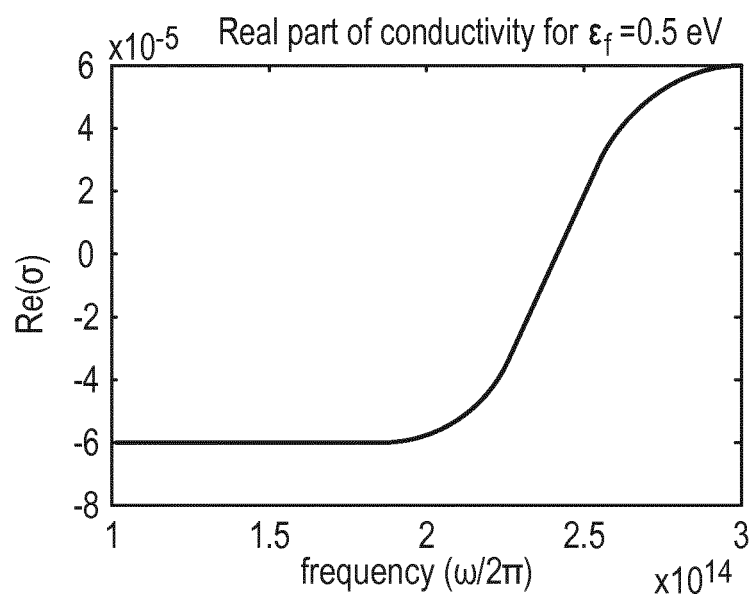
FIG. 6 illustrates the real part of the conductivity of graphene in a depletion region.

FIG. 6 illustrates the real part of the conductivity of graphene in a depletion region. As can be seen from this graph, the real part of the conductivity of graphene becomes negative at around $2.4 \times 10^{14}$ Hz.

The dynamic conductivity $\sigma_i$ of the inverted graphene (depletion region) may be given by two terms. The first term is the conductivity related to the intra-band transition contribution $\sigma_{intra}$, the remaining term correspond to the inter-band transition contribution $\sigma_{intra}$, which is related to the population inversion.

For example, the dynamic conductivity oi of the inverted graphene may be given by $$\sigma_i = \frac{e^2 k_B T \tau}{4\pi\hbar(1 - i\omega\tau)} \ln[1 + \exp(\varepsilon_F/k_B T)] + \qquad (1)$$

$$\frac{e^2}{4\hbar} \tanh\left(\frac{\hbar\omega - 2\varepsilon_F}{4k_B T}\right) - \frac{e^2 \omega}{i\pi} \int_0^\infty \frac{G(\varepsilon, \varepsilon_F) - G(\hbar\omega/2, \varepsilon_F)}{(\hbar\omega)^2 - 4\varepsilon^2} d\varepsilon$$

Where $G(\varepsilon, \varepsilon_F) = \frac{\sinh(\varepsilon/k_B T)}{\cosh(\varepsilon/k_B T) + \cosh(\varepsilon_F/k_B T)}$.

In equation (1) $\omega$ is the angular frequency of the incoming radiation, $\varepsilon$ is the energy state integration variable, $\varepsilon_F$ is the Fermi energy, t is the intra-band carrier relaxation time of graphene, which is estimated as $10^{-12}$ s for room temperature. T is the local temperature, h is the reduced Planck constant and $k_B$ the Boltzmann constant.

In other words, when a suitable voltage is applied to the graphene layer, the graphene is in population inversion where electrons are in the conduction band whilst holes are present in the valence band. These conditions allow for stimulated emission of further surface polariton waves due to the incident electromagnetic radiation. By holding the graphene in depletion by applying a voltage, the graphene remains in population inversion, and the stimulated emission can continue to occur.

The real part of the inter-band contribution may therefore be negative and may be larger than the real part of intra-band contribution, so to give an overall negative conductivity. The negative real part of the conductivity corresponds to amplification of the incoming radiation, whereas positive real part corresponds to absorption of the incoming radiation.

The dynamic conductivity of graphene in the depletion region may be controlled through the voltage bias value applied to the electrical contacts (as illustrated in FIG. 3), which determines a change in the Fermi energy level of the carriers. It will be appreciated, that graphene is given here as an example material for the first layer 106, and that the first layer 106 may comprise any other material which exhibits properties allowing for similar results. For example, the first layer 106 may comprise a material that has a negative dynamic conductivity. For example, the first layer 106 may comprise a single atomic layer or only a small number of atomic layers.

The relationship between the bias voltage V and the obtained Fermi energy $E_f$ for graphene is approximately $E_f$=eV/2 where e is the electron charge $1.6 \times 10^{-19}$ C.

Figure 7:
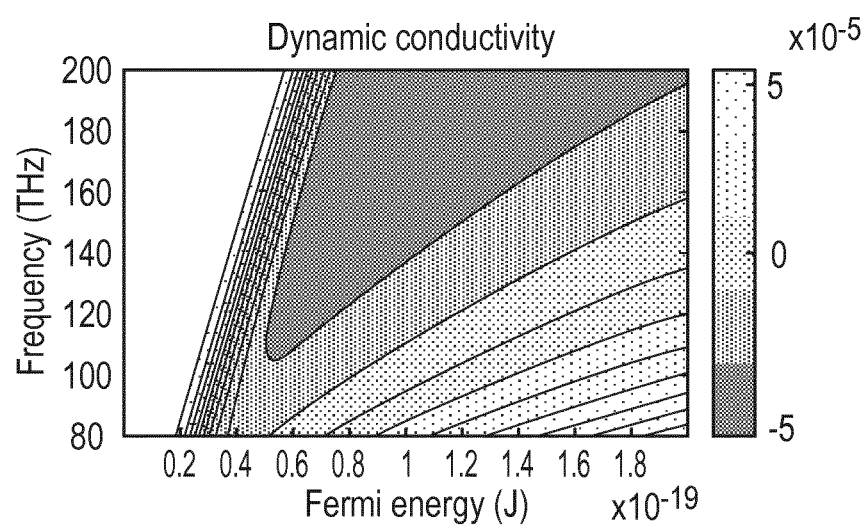
FIG. 7 illustrates the dynamic conductivity of isolated graphene and its dependency on both the Fermi Energy and the frequency of the electromagnetic radiation.

As illustrated in FIG. 7 the dynamic conductivity of isolated graphene is dependent on both the Fermi Energy and the frequency of the electromagnetic radiation. It will therefore be appreciated that by tuning the Fermi energy by controlling the bias voltage applied to the first layer 106, the magnitude of the dynamic conductivity can be maximised for particular frequencies.

In particular, FIG. 7 illustrates the feasibility of the solution for a range of wavelength/frequencies that is of interest for telecommunication, e.g. 191-196 THz (C band). In particular, it can be seen that, for the C band, a bias voltage of about 1V is sufficient to reach a large magnitude of the negative conductivity of graphene.

Figure 8A:
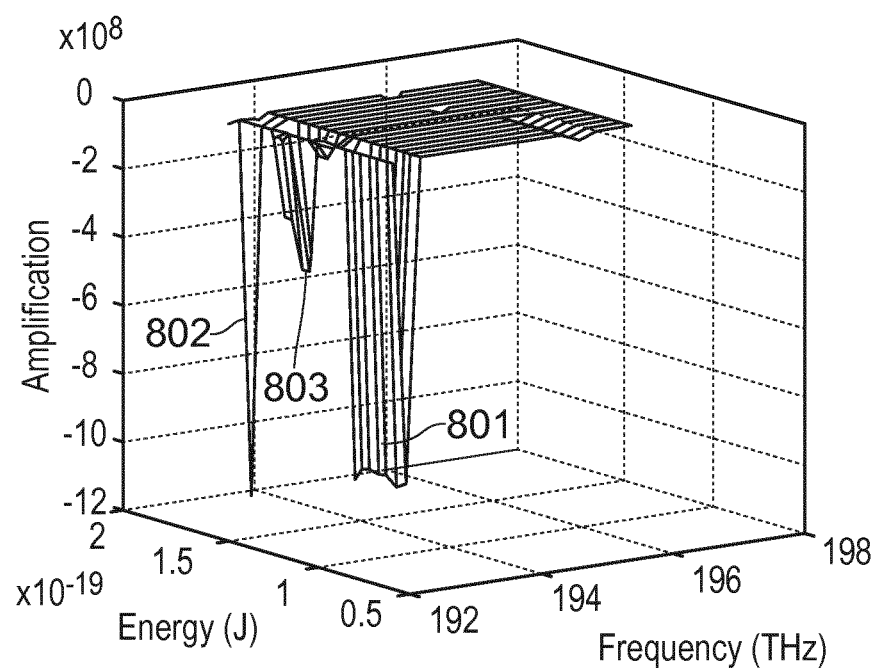
FIGS. 8a and 8b illustrate the amplification provided by a graphene first layer, configured as illustrated in FIG. 3, over a period $a_{mod}$.
Figure 8B:
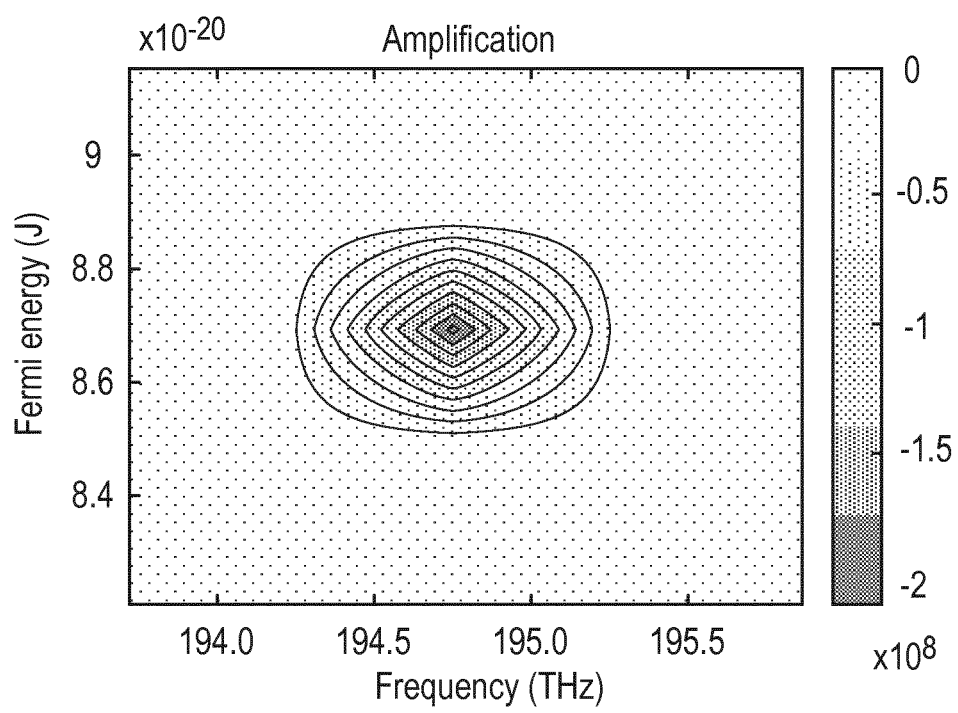

FIGS. 8a and 8b illustrate the amplification provided by a graphene first layer, configured as illustrated in FIG. 3, over a period $a_{mod}$.

In this example, the electrical contacts are of a width $l_1$=0.25 um and a depletion region width between the contacts is $d_1$=1 um, with reference to FIG. 3. In this example, the core region material is Silicon Dioxide and the cladding region material is Silicon.

The depletion region, $d_1$, may have a larger area (i.e. a larger width as the height of the graphene strip is constant, d>2l) than the total area of the doped regions. This may ensure the dominance of amplification in the depletion over the non-amplifying n and p regions.

In FIGS. 8a and 8b the amplification is expressed as negative absorption. As previously, the amplification is dependent on the Fermi Energy and the frequency of the incoming radiation. Therefore, as illustrated in FIGS. 8a and 8b a peak 801 occurs at around a frequency of 193 THz, within the C band of interest.

In particular, FIG. 8b illustrates the detail of the resonance peak 801.

The peaks towards the lower fermi energy values, 802 and 803 (illustrated in FIG. 8a), may be caused by other effects in the materials, for example, effects caused by the core region and cladding region materials as well as the first layer.

These simulations in FIGS. 8a and 8b illustrate the presence of a peak in the amplification of the waveguide (expressed as negative absorption) when the periodicity of the electrical contacts is such to satisfy the momentum matching conditions between the light propagating in the core, i.e. the 193 THz electromagnetic radiation, and the surface polariton wave. The maximum value of the amplification for the resonant frequency may depend on the Fermi energy that has been set by altering the voltage applied to the electrical contacts.

As illustrated, the magnitude of the amplification, in the example in FIGS. 8a and 8b may be high, for example, the amplification may be larger than 10 dB. In some examples therefore, a voltage is applied to the first set of electrical contacts 108 such that the dynamic negative conductivity of the first layer 106 is at a maximum magnitude for the first wavelength.

It is difficult to estimate the phase noise from the numerical and analytical models. In particular, recombination in this scenario has a characteristic time $t=10^{-12}$s. However, for example, the spontaneous emission in graphene does not satisfy the momentum matching conditions in the range of wavelengths under consideration. Therefore, this spontaneous emission should not propagate along the interface, and will not therefore be amplified.

As embodiments described herein are based on a resonance mechanism, and the efficiency is peaked at a resonant frequency, embodiments described herein may be used for wavelength selection in a similar manner as a Bragg grating. For this reason, tuning through temperature control (thermoelectric effect) is envisaged, using similar solutions as those applied to Bragg gratings. In other words, the wavelengths of interest may be propagated and amplified along the first layer 106 utilizing the surface polariton waves and an appropriate voltage applied to the electrical contacts.

It will be appreciated that thermal noise may generate a broadening, for example a symmetric broadening, of the amplification peak 801. A similar effect may be generated as a consequence of the fluctuation of the size of the first set of electrical contacts 108 due to fabrication tolerances.

In some embodiments, amplification or a reduction in losses, may be provided for two or more wavelengths of interest. For example, for telecommunications, the wavelengths 1310 nm and 1550 nm (O and C bands) may be of interest.

Figure 9:
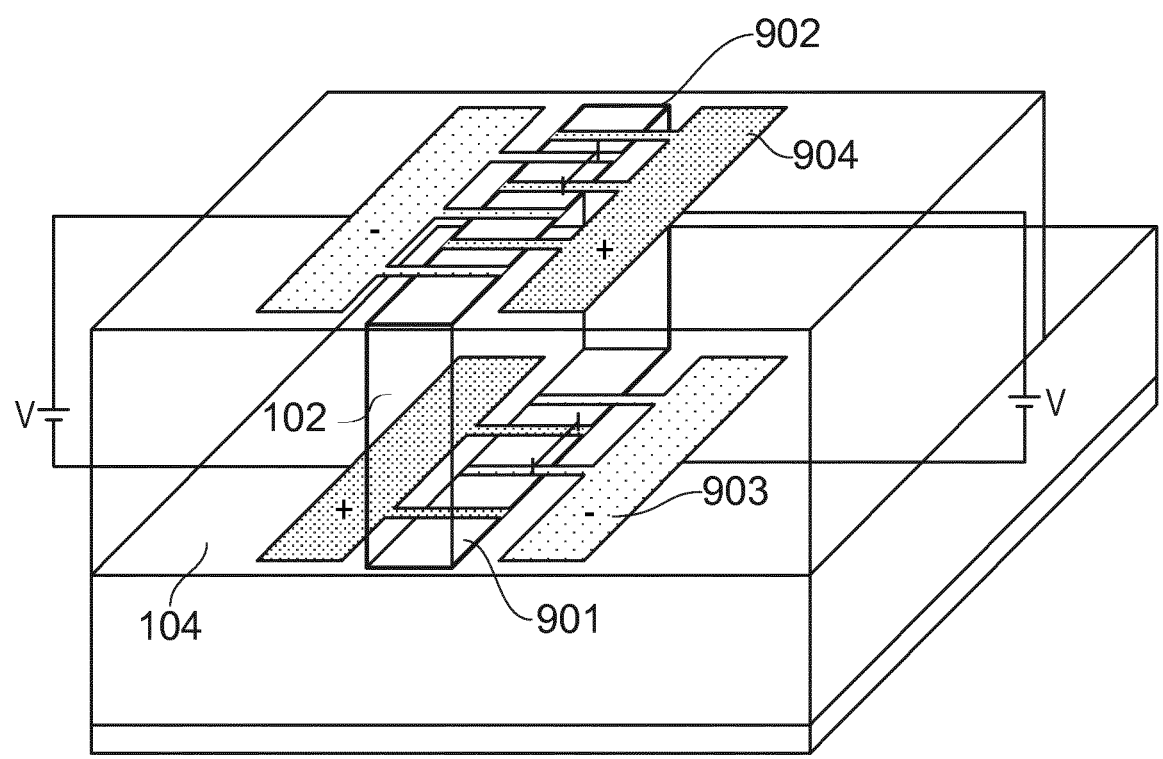
FIG. 9 illustrates an example waveguide according to some embodiments.

For example, as illustrated in FIG. 9, a waveguide 100 may be provided with two layers of material, a first layer 901 and a second layer 902. The first layer 901 and the second layer 902 may both comprise the material, e.g. graphene, having a thickness of less than a skin depth of the material for either a electromagnetic radiation of a first wavelength or a second wavelength, wherein the second layer 902 is positioned at or close to the interface between the core region and the cladding region separately from the first layer 901.

In this example, electrical contacts are applied to the first layer 901 and the second layer 902. In particular, a first set of electrical contacts 903 may be positioned to locally electrostatically dope the first layer 901 to generate a first periodic refractive index in the first layer 901 such that a first surface polariton wave is excited at the interface between the core region and cladding region when electromagnetic radiation of a first wavelength, for example 1310 nm, is transmitted through the core region 102.

Another set of electrical contacts 904 may be positioned to locally dope the second layer 902 to generate a second periodic irregular refractive index in the second layer such that either: the first surface polariton wave is excited when electromagnetic radiation of the first wavelength is transmitted through the core region 102, or a third surface polariton wave is excited when electromagnetic radiation of a third wavelength is transmitted through the core region. In other words, the second layer 902 may be configured with electrical contacts such that the same wavelength of radiation excites surface wave polaritons as the first layer 901, or, the electrical contacts applied to the second layer 902 may have a different spacing, such that a different wavelength of electromagnetic radiation excites surface polariton waves.

For example, the first set of electrical contacts 903 may be selected for matching with the O band the second set of electrical contacts 904 may have a periodicity selected for matching with the C band radiation.

In some examples it will be appreciated that the two sets of electrical contacts, 903 and 904 may both be provided on the first layer 901. In this example, a first set of electrical contacts positioned to locally electrostatically dope the first layer 901 to generate the periodic irregular refractive index in the first layer 901 such that the first surface polariton wave is excited when electromagnetic radiation of the first wavelength, e.g. 1310 nm, is transmitted through the core region. The second set of electrical contacts 904 may be positioned to locally electrostatically dope the first layer 901 to generate a second periodic irregular refractive index in the first layer 901 such that a second surface polariton wave is excited when electromagnetic radiation of a second wavelength, e.g. 1550 nm, is transmitted through the core region.

In these examples, the first set of electrical contacts may be positioned such that $a_{mod,1}=d_1+2l_1$ where $d_1$ is a distance between two adjacent contacts of the first set of electrical contacts, and $l_1$ is a width of a contact in the first set of electrical contacts. The second set of electrical contacts are positioned such that a second contact distance $a_{mod,2}$ is equal to the second wavelength, wherein $a_{mod,2}=d_2+2l_2$ where $d_2$ is a distance between two adjacent contacts of the second set of electrical contacts and $l_2$ is a width of a contact in the second set of electrical contacts.

In this example, the first set of electrical contacts 903 and second set of electrical contacts 904 may be configured to be selectively charged in order to excite either the first surface polariton or the second surface polariton.

In some examples, the voltage applied to the first and/or second set of electrical contacts is selected to obtain amplification only on the array that is designed for the desired band. Fine tuning of the gain peak as a function of the wavelength of the incoming electromagnetic radiation may be obtained through refractive index variation, induced by a local heater. A change in temperature may induce a local variation of the refractive index.

In some examples, phase matching for the conversion of the electromagnetic radiation in the core region 102 into the surface polariton wave may be regulated through the voltage V applied to the electrical contacts. The same method may be used to adjust any phase mismatch or interference with that portion of electromagnetic radiation in the core region that might not couple with the graphene surface. In principle the travelling wave in the core region may have a varying wavevector (wavelength) that may vary due to refractive index imperfections in the waveguide, or for example, a change of shape of the waveguide (e.g. curved waveguides). This may require a fine tuning which may be provided through voltage control to change the Fermi energy and, thereby, change the dynamic conductivity. This method may optimize the negative conductivity value to have more amplification at a given wavevector (wavelength).

In some examples, a varying gate voltage along the periodic structure of electrical contacts may be used to shape the amplification and provide amplitude modulation.

Figure 10:
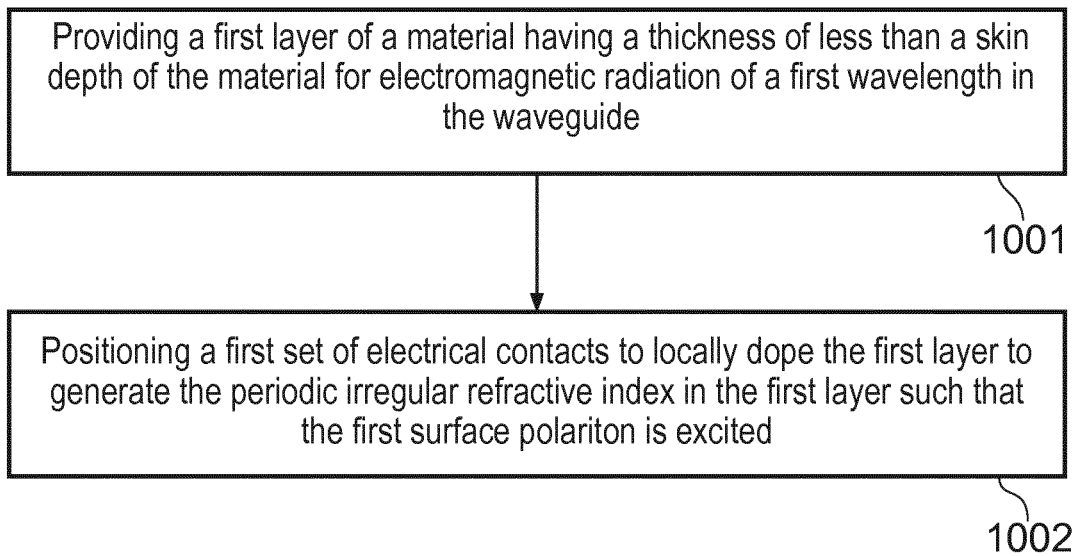
FIG. 10 illustrates a method of manufacture of a waveguide according to some embodiments.

FIG. 10 illustrates a method of manufacture of a waveguide, for example the waveguide illustrated in FIG. 1.

In step 1001, the method comprises providing a first layer of a material having a thickness of less than a skin depth of the material for electromagnetic radiation of a first wavelength in a waveguide, wherein the first layer is positioned within the waveguide and configured with a periodic refractive index such that a first surface polariton wave is excited at an interface between a core region of the waveguide and a cladding region of the waveguide when electromagnetic radiation of a first wavelength is transmitted through the core region.

In some examples, the method further comprises step 1002 which comprises applying a first set of electrical contacts to locally dope the first layer to generate the periodic irregular refractive index in the first layer such that the first surface polariton wave is excited.

There is therefore provided a waveguide for reducing losses due to scattering of electromagnetic radiation into the cladding region of the waveguide, and in some embodiments for amplifying the electromagnetic radiation at a certain wavelength. There is also provided a method of manufacture of the waveguide.

The invention claimed is:

1. A waveguide for transmitting electromagnetic radiation, the waveguide comprising:
   a core region,
   a cladding region extending around the core region; and
   a first layer of a material having a thickness of less than a skin depth of the material for electromagnetic radiation of a first wavelength;
   wherein the first layer is configured with a periodic refractive index and positioned within the waveguide such that a first surface polariton wave is excited at an interface between the core region and cladding region when electromagnetic radiation of the first wavelength is transmitted through the core region; and
   wherein a momentum of the first surface polariton wave $k_{s,1}$ added with an additional momentum caused by the periodic refractive index is matched with a second momentum of the electromagnetic radiation of the first wavelength $k_c$.

2. A waveguide as claimed in claim 1, wherein the first layer of material is located within a skin depth of a surface polariton wave generated by the electromagnetic radiation from the core region from the interface between the core region and the cladding region.

3. A waveguide as claimed in claim 1 wherein the length of the waveguide extends for one or more periodic refractive index.

4. The waveguide as claimed in claim 1 wherein the first layer is configured with periodic carrier density variations to generate the periodic refractive index.

5. The waveguide as claimed in claim 4 wherein the periodic carrier density variations comprise a pn junction.

6. The waveguide as claimed in claim 1 further comprising a first set of electrical contacts positioned to locally electrostatically dope the first layer to generate the periodic refractive index in the first layer.

7. The waveguide as claimed in claim 6, wherein the first set of electrical contacts are positioned such that $a_{mod,1}=d_1+2l_1$, where $d_1$ comprises a distance between two adjacent contacts of the first set of electrical contacts and $l_1$ is a width of a contact in the first set of electrical contacts.

8. The waveguide as claimed in claim 7 further comprising a second set of electrical contacts positioned to locally electrostatically dope the first layer to generate a second periodic irregular refractive index in the first layer such that a second surface polariton wave is excited when electromagnetic radiation of a second wavelength is transmitted through the core region.

9. The waveguide as claimed in claim 8 wherein the second set of electrical contacts are positioned such that a second contact distance $a_{mod,2}$ is equal to the second wavelength, wherein $a_{mod,2}=d_2+2l_2$, where $d_2$ comprises a distance between two adjacent contacts of the second set of electrical contacts and $l_2$ is a width of a contact in the second set of electrical contacts.

10. The waveguide as claimed in claim 9 wherein a momentum of the second surface polariton wave $k_{s,2}'$ is:

$$k'_{s,2} = \left(k_{s,2} + \frac{\omega_2 n \lambda_2}{c a_{mod,2}}\right)$$

where $k_{s,2}$ is a momentum of a predicted surface polariton wave at the interface between the core region and the cladding region with no local doping of the first layer, and n is an integer value, $\omega_2$ is a frequency of electromagnetic radiation of the second wavelength, and $\lambda_2$ is the second wavelength.

11. The waveguide as claimed in claim 8 wherein the first set of electrical contacts and second set of electrical contacts are configured to be selectively charged in order to excite either the first surface polariton or the second surface polariton.

12. The waveguide as claimed in claim 1 wherein the momentum of the first surface polariton wave $k_{s,1}'$ is:

$$k'_{s,1} = \left(k_{s,1} + \frac{\omega m \lambda}{c a_{mod,1}}\right)$$

where $k_{s,1}$ is a momentum of a predicted surface polariton wave at the interface between the core region and the cladding region with no local doping of the first layer, and m is an integer value, $\omega$ is a frequency of the electromagnetic radiation of the first wavelength, $\lambda$ is the first wavelength, and $a_{mod,1}$ is a period of the periodic refractive index.

13. The waveguide as claimed in claim 1, further comprising:
   a second layer of the material having a thickness of less than a skin depth of the material, wherein the second layer is positioned between the core region and the cladding region separately from the first layer.

14. The waveguide as claimed in claim 13 further comprising:
   a third set of electrical contacts positioned to locally dope the second layer to generate a periodic irregular refractive index in the second layer such that either: the first surface polariton wave is excited when electromagnetic radiation of the first wavelength is transmitted through the core region, or a third surface polariton wave is excited when electromagnetic radiation of a third wavelength is transmitted through the core region.

15. The waveguide as claimed in claim 1 wherein the material comprises graphene.

16. The waveguide as claimed in claim 1 wherein the material has a negative dynamic conductivity.

17. The waveguide as claimed in claim 16 further comprising a first set of electrical contacts positioned to locally electrostatically dope the first layer to generate the periodic refractive index in the first layer and wherein a voltage is applied to the first set of electrical contacts such that the dynamic negative conductivity of the first layer is at a maximum magnitude for the first wavelength.

18. A method of manufacture of a waveguide comprising:
providing a first layer of a material having a thickness of less than a skin depth of the material for electromagnetic radiation of a first wavelength in a waveguide, wherein
the first layer is positioned within the waveguide and configured with a periodic refractive index such that a first surface polariton wave is excited at an interface between a core region of the waveguide and a cladding region of the waveguide when electromagnetic radiation of a first wavelength is transmitted through the core region; and
a momentum of the first surface polariton wave $k_{s,1}$ added with an additional momentum caused by the periodic refractive index is matched with a second momentum of the electromagnetic radiation of the first wavelength $k_c$.

19. A method as claimed in claim 18 further comprising:
applying a first set of electrical contacts to locally dope the first layer to generate the periodic refractive index in the first layer such that the first surface polariton wave is excited.

\* \* \* \* \*